United States Patent
Oskam

(10) Patent No.: US 9,182,124 B2
(45) Date of Patent: Nov. 10, 2015

(54) GAS TURBINE AND FUEL INJECTOR FOR THE SAME

(75) Inventor: Gareth W. Oskam, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 999 days.

(21) Appl. No.: 13/326,798

(22) Filed: Dec. 15, 2011

(65) Prior Publication Data

US 2013/0152593 A1 Jun. 20, 2013

(51) Int. Cl.
*F23R 3/28* (2006.01)
*F23R 3/36* (2006.01)
*F23D 11/10* (2006.01)
*F23D 14/22* (2006.01)
*F02C 3/30* (2006.01)

(52) U.S. Cl.
CPC .............. *F23R 3/28* (2013.01); *F23D 11/107* (2013.01); *F23D 14/22* (2013.01); *F23R 3/36* (2013.01); *F02C 3/30* (2013.01)

(58) Field of Classification Search
CPC .............. F02C 3/30; F23R 3/286; F23R 3/36; F23R 3/28; F23R 3/14; F23R 3/343; F23R 3/30; F23R 3/32; F23D 14/20; F23D 14/22; F23D 14/24; F23D 2204/10; F23D 2204/20; F23D 2204/30; F23D 11/106; F23D 11/107; F23D 11/108
USPC ........ 60/737, 742, 748, 39.55, 39.58, 39.826; 239/406, 413, 416.1, 416.4–416.5, 239/422–424
See application file for complete search history.

(56) References Cited

U.S. PATENT DOCUMENTS

| 1,322,999 | A | 11/1919 | Bester |
| 2,206,070 | A | 7/1940 | Andler |

(Continued)

FOREIGN PATENT DOCUMENTS

| DE | 102005022772 A1 | 1/2007 |
| DE | 102007062896 A1 | 7/2008 |

(Continued)

OTHER PUBLICATIONS

Tacina, R., A Low NOx Lean-Direct Injection, Multipoint Integrated Module Combustor Concept for Advanced Aircraft Gas Turbines, NASA TM-2002-211347, Apr. 2002.
U.S. Appl. No. 13/110,210 titled "Lean Direct Fuel Injector", filed May 18, 2011, 23 pages.
U.S. Appl. No. 13/110,179 titled "Method of Operating a Gas Turbine Engine", filed May 18, 2011, 24 pages.
U.S. Appl. No. 13/327,131 titled "Gas Turbine and Fuel Injector for the Same", filed Dec. 15, 2011, 21 pages.

*Primary Examiner* — Andrew Nguyen
(74) *Attorney, Agent, or Firm* — Finnegan, Henderson, Farabow, Garrett & Dunner, LLP

(57) ABSTRACT

A fuel injector for a gas turbine engine may include an injector housing having a central cavity configured to be fluidly coupled to a combustor of the turbine engine. The central cavity may also be configured to direct a first fuel into the combustor substantially unmixed with air. The fuel injector may also include an annular air discharge outlet circumferentially disposed about the downstream end of the central cavity. The air discharge outlet may be configured to discharge compressed air into the combustor circumferentially about the first fuel from the central cavity. The fuel injector may also include an annular fuel discharge outlet circumferentially disposed about the air discharge outlet at the downstream end. The fuel discharge outlet may be configured to discharge a second fuel into the combustor circumferentially about the compressed air from the air discharge outlet.

18 Claims, 4 Drawing Sheets

(56) References Cited

U.S. PATENT DOCUMENTS

| | | | |
|---|---|---|---|
| 2,551,276 A | 5/1951 | McMahan | |
| 2,607,193 A | 8/1952 | Berggren et al. | |
| 2,612,405 A | 9/1952 | Kirschbaum | |
| 2,850,875 A | 9/1958 | Gähwyler | |
| 2,911,035 A | 11/1959 | Nieman et al. | |
| 2,968,925 A | 1/1961 | Blevans et al. | |
| 3,013,732 A | 12/1961 | Webster et al. | |
| 3,285,007 A | 11/1966 | Carlisle et al. | |
| 3,302,399 A | 2/1967 | Tini et al. | |
| 3,310,240 A | 3/1967 | Grundman | |
| 3,430,443 A | 3/1969 | Richardson et al. | |
| 3,474,970 A | 10/1969 | Simmons et al. | |
| 3,533,558 A | 10/1970 | Masters | |
| 3,570,242 A | 3/1971 | Leonardi et al. | |
| 3,638,865 A | 2/1972 | McEneny et al. | |
| 3,684,186 A | 8/1972 | Helmrich | |
| 3,703,259 A | 11/1972 | Sturgess et al. | |
| 3,811,278 A | 5/1974 | Taylor et al. | |
| 3,853,273 A | 12/1974 | Bahr et al. | |
| 3,866,413 A | 2/1975 | Sturgess | |
| 3,886,736 A | 6/1975 | Kawaguchi | |
| 3,899,884 A | 8/1975 | Ekstedt | |
| 3,934,409 A | 1/1976 | Quillévéréet al. | |
| 3,937,011 A | 2/1976 | Caruel et al. | |
| 3,938,324 A | 2/1976 | Hammond, Jr. et al. | |
| 3,972,182 A | 8/1976 | Salvi | |
| 3,980,233 A | 9/1976 | Simmons et al. | |
| 4,052,844 A | 10/1977 | Caruel et al. | |
| 4,058,977 A | 11/1977 | Markowski et al. | |
| 4,092,826 A | 6/1978 | Pask | |
| 4,105,163 A | 8/1978 | Davis, Jr. et al. | |
| 4,139,157 A | 2/1979 | Simmons | |
| 4,168,803 A | 9/1979 | Simmons et al. | |
| 4,180,974 A | 1/1980 | Stenger et al. | |
| 4,193,260 A | 3/1980 | Carlisle et al. | |
| 4,198,815 A | 4/1980 | Bobo et al. | |
| 4,215,535 A | 8/1980 | Lewis | |
| 4,278,418 A | 7/1981 | Strenkert | |
| 4,285,664 A | 8/1981 | Voorheis | |
| 4,292,801 A | 10/1981 | Wilkes et al. | |
| 4,389,848 A | 6/1983 | Markowski et al. | |
| 4,407,128 A | 10/1983 | Kwan | |
| 4,410,140 A | 10/1983 | Nowak | |
| 4,418,543 A | 12/1983 | Faucher et al. | |
| 4,425,755 A | 1/1984 | Hughes | |
| 4,443,182 A | 4/1984 | Wojcieson et al. | |
| 4,445,338 A | 5/1984 | Markowski et al. | |
| 4,483,137 A | 11/1984 | Faulkner | |
| 4,499,735 A | 2/1985 | Moore et al. | |
| 4,532,762 A | 8/1985 | Mongia et al. | |
| 4,584,834 A | 4/1986 | Koshoffer et al. | |
| 4,600,151 A | 7/1986 | Bradley | |
| 4,609,150 A | 9/1986 | Pane, Jr. et al. | |
| 4,671,069 A | 6/1987 | Sato et al. | |
| 4,693,074 A | 9/1987 | Pidcock et al. | |
| 4,726,192 A | 2/1988 | Willis et al. | |
| 4,731,989 A | 3/1988 | Furuya et al. | |
| 4,754,922 A | 7/1988 | Halvorsen et al. | |
| 4,831,700 A | 5/1989 | Halvorsen et al. | |
| 4,845,940 A | 7/1989 | Beer | |
| 4,854,127 A | 8/1989 | Vinson et al. | |
| 4,887,425 A | 12/1989 | Vdoviak | |
| 4,891,935 A | 1/1990 | McLaurin et al. | |
| 4,898,001 A | 2/1990 | Kuroda et al. | |
| 4,928,481 A | 5/1990 | Joshi et al. | |
| 4,938,019 A | 7/1990 | Angell et al. | |
| 4,938,417 A | 7/1990 | Halvorsen | |
| 4,967,551 A | 11/1990 | Faulkner | |
| 4,974,416 A | 12/1990 | Taylor | |
| 4,974,571 A | 12/1990 | Oppenheim et al. | |
| 4,977,740 A * | 12/1990 | Madden et al. | 60/39.463 |
| 5,000,004 A | 3/1991 | Yamanaka et al. | |
| 5,001,895 A | 3/1991 | Shekleton et al. | |
| 5,014,918 A | 5/1991 | Halvorsen | |
| 5,020,329 A | 6/1991 | Ekstedt et al. | |
| 5,062,792 A | 11/1991 | Maghon | |
| 5,069,029 A | 12/1991 | Kuroda et al. | |
| 5,102,054 A | 4/1992 | Halvorsen | |
| 5,115,634 A | 5/1992 | Bretz et al. | |
| 5,117,637 A | 6/1992 | Howell et al. | |
| 5,121,608 A | 6/1992 | Willis et al. | |
| 5,123,248 A | 6/1992 | Monty et al. | |
| 5,154,060 A | 10/1992 | Walker et al. | |
| 5,161,366 A | 11/1992 | Beebe | |
| 5,165,241 A | 11/1992 | Joshi et al. | |
| 5,201,181 A | 4/1993 | Ohmori et al. | |
| 5,209,067 A | 5/1993 | Barbier et al. | |
| 5,218,824 A * | 6/1993 | Cederwall et al. | 60/737 |
| 5,224,333 A | 7/1993 | Bretz et al. | |
| 5,251,447 A | 10/1993 | Joshi et al. | |
| 5,256,352 A | 10/1993 | Snyder et al. | |
| 5,259,184 A | 11/1993 | Borkowicz et al. | |
| 5,267,442 A | 12/1993 | Clark | |
| 5,274,995 A | 1/1994 | Horner et al. | |
| 5,394,688 A | 3/1995 | Amos | |
| 5,423,173 A | 6/1995 | Lemon et al. | |
| 5,431,559 A * | 7/1995 | Taylor | 431/164 |
| 5,452,574 A | 9/1995 | Cowell et al. | |
| 5,491,972 A | 2/1996 | Bretz et al. | |
| 5,505,045 A | 4/1996 | Lee et al. | |
| 5,540,056 A | 7/1996 | Heberling et al. | |
| 5,558,515 A | 9/1996 | Althaus et al. | |
| 5,567,141 A * | 10/1996 | Joshi et al. | 431/8 |
| 5,569,020 A | 10/1996 | Griffin et al. | |
| 5,590,529 A | 1/1997 | Joshi et al. | |
| 5,592,819 A | 1/1997 | Ansart et al. | |
| 5,603,211 A | 2/1997 | Graves | |
| 5,605,287 A | 2/1997 | Mains | |
| 5,613,363 A | 3/1997 | Joshi et al. | |
| 5,623,827 A | 4/1997 | Monty | |
| 5,638,682 A | 6/1997 | Joshi et al. | |
| 5,647,538 A | 7/1997 | Richardson | |
| 5,664,412 A | 9/1997 | Overton | |
| 5,680,766 A | 10/1997 | Joshi et al. | |
| 5,688,115 A | 11/1997 | Johnson | |
| 5,697,553 A | 12/1997 | Stotts | |
| 5,737,921 A | 4/1998 | Jones et al. | |
| 5,761,907 A | 6/1998 | Pelletier et al. | |
| 5,784,875 A * | 7/1998 | Statler | 60/775 |
| 5,822,992 A | 10/1998 | Dean | |
| 5,826,429 A | 10/1998 | Beebe et al. | |
| 5,836,163 A | 11/1998 | Lockyer et al. | |
| 5,899,074 A | 5/1999 | Komatsu et al. | |
| 5,899,076 A | 5/1999 | Snyder et al. | |
| 5,908,160 A | 6/1999 | Kramer et al. | |
| 5,930,999 A | 8/1999 | Howell et al. | |
| 5,960,724 A | 10/1999 | Toqan et al. | |
| 5,966,937 A | 10/1999 | Graves | |
| 6,021,635 A | 2/2000 | Gaag et al. | |
| 6,038,861 A | 3/2000 | Amos et al. | |
| 6,068,470 A | 5/2000 | Zarzalis et al. | |
| 6,070,411 A | 6/2000 | Iwai et al. | |
| 6,076,356 A | 6/2000 | Pelletier | |
| 6,082,111 A | 7/2000 | Stokes | |
| 6,101,814 A * | 8/2000 | Hoke et al. | 60/752 |
| 6,141,967 A | 11/2000 | Angel et al. | |
| 6,148,603 A * | 11/2000 | Althaus | 60/778 |
| 6,189,314 B1 | 2/2001 | Yamamoto et al. | |
| 6,286,298 B1 | 9/2001 | Burrus et al. | |
| 6,295,801 B1 | 10/2001 | Burrus et al. | |
| 6,301,899 B1 | 10/2001 | Dean et al. | |
| 6,311,496 B1 | 11/2001 | Alkabie | |
| 6,363,726 B1 | 4/2002 | Durbin et al. | |
| 6,367,262 B1 | 4/2002 | Mongia et al. | |
| 6,374,615 B1 | 4/2002 | Zupanc et al. | |
| 6,378,310 B1 | 4/2002 | Le Gal et al. | |
| 6,405,523 B1 | 6/2002 | Foust et al. | |
| 6,415,594 B1 | 7/2002 | Durbin et al. | |
| 6,418,726 B1 | 7/2002 | Foust et al. | |
| 6,457,316 B1 | 10/2002 | Czachor et al. | |
| 6,484,489 B1 | 11/2002 | Foust et al. | |
| 6,755,024 B1 | 6/2004 | Mao et al. | |
| 6,871,488 B2 | 3/2005 | Oskooei et al. | |
| 6,871,501 B2 | 3/2005 | Bibler et al. | |

(56) References Cited

U.S. PATENT DOCUMENTS

| | | |
|---|---|---|
| 6,931,854 B2 | 8/2005 | Saitoh et al. |
| 6,945,051 B2 | 9/2005 | Benelli et al. |
| 6,968,692 B2 | 11/2005 | Chin et al. |
| 6,976,363 B2 | 12/2005 | McMasters et al. |
| 6,993,916 B2 | 2/2006 | Johnson et al. |
| 7,010,923 B2 | 3/2006 | Mancini et al. |
| 7,251,940 B2 | 8/2007 | Graves et al. |
| 7,343,745 B2 | 3/2008 | Inoue et al. |
| 7,406,827 B2 | 8/2008 | Bernero et al. |
| 7,415,826 B2 | 8/2008 | McMasters et al. |
| 7,464,553 B2 | 12/2008 | Hsieh et al. |
| 7,506,510 B2 | 3/2009 | Thomson |
| 7,520,272 B2 | 4/2009 | Fritz et al. |
| 7,536,862 B2 | 5/2009 | Held et al. |
| 7,546,734 B2 | 6/2009 | Dorr et al. |
| 2005/0039456 A1 | 2/2005 | Hayashi |

FOREIGN PATENT DOCUMENTS

| | | |
|---|---|---|
| DE | 102007038220 A1 | 2/2009 |
| EP | 444811 A1 | 9/1991 |
| EP | 780638 A2 | 6/1997 |
| EP | 1719950 A2 | 11/2006 |
| EP | 1424526 A3 | 4/2007 |
| EP | 1959196 A2 | 8/2008 |
| EP | 1959197 A2 | 8/2008 |
| GB | 2432206 A | 5/2007 |
| WO | WO 2005121649 A3 | 9/2006 |

* cited by examiner

GAS TURBINE AND FUEL INJECTOR FOR THE SAME

TECHNICAL FIELD

The present disclosure relates generally to a gas turbine engine and fuel injectors for the gas turbine engine.

BACKGROUND

In a typical gas turbine engine (GTE), one or more fuel injectors direct a liquid or gaseous hydrocarbon fuel into a combustion chamber (called combustor) for combustion. The combustion of hydrocarbon fuels in the combustor produce undesirable exhaust constituents such as $NO_x$. Different techniques are used to reduce the amount of $NO_x$ emitted by GTEs. In one technique, a lean premixed fuel-air mixture is directed to the combustor to burn at a relatively low combustion temperature. A low combustion temperature reduces $NO_x$ formation. In another technique, steam is directed to the combustor to reduce the temperature and reduce $NO_x$ production. U.S. Pat. No. 7,536,862 B2 to Held et al. (the '862 patent) describes a fuel injector for a gas turbine engine in which fuel is injected from the fuel injector into the combustor through primary and secondary openings. Steam is injected alongside the fuel to decrease the temperature of the flame in the combustor, and thereby reduce $NO_x$ production.

SUMMARY

In one aspect, a fuel injector for a gas turbine engine is disclosed. The fuel injector may include an injector housing including a central cavity extending along a longitudinal axis from an upstream end to a downstream end. The downstream end of the central cavity may be configured to be fluidly coupled to a combustor of the turbine engine. The central cavity may also be configured to direct a first fuel into the combustor substantially unmixed with air. The fuel injector may also include an annular air discharge outlet circumferentially disposed about the downstream end of the central cavity. The air discharge outlet may be configured to discharge compressed air into the combustor circumferentially about the first fuel from the central cavity. The fuel injector may also include an annular fuel discharge outlet circumferentially disposed about the air discharge outlet at the downstream end. The fuel discharge outlet may be configured to discharge a second fuel into the combustor circumferentially about the compressed air from the air discharge outlet.

In another aspect, a method of operating a gas turbine engine is disclosed. The method may include directing a gaseous fuel into a combustor of the gas turbine engine through a central cavity of a fuel injector substantially unmixed with compressed air. The central cavity may extend longitudinally from an upstream end to a downstream end. The downstream end of the central cavity may be fluidly coupled to the combustor. The method may also include directing compressed air into the combustor circumferentially about the central cavity. The method may further include directing a second fuel into the combustor circumferentially about the compressed air. Directing the second fuel may include increasing an angular velocity of the second fuel in the fuel injector.

In yet another aspect, a gas turbine engine is disclosed. The gas turbine engine includes a compressor system, a turbine system, and a combustor system including a combustor. The gas turbine engine may also include a fuel injector extending from an upstream end to a downstream end. The fuel injector may be coupled to the combustor at the downstream end. The fuel injector may include a central cavity extending from the upstream end to the downstream end along a longitudinal axis. The central cavity may be configured to direct a gaseous fuel into the combustor substantially unmixed with compressed air. The fuel injector may also include an annular inner passageway extending from the upstream end to the downstream end. The downstream end of the inner air passageway may include an air discharge outlet. The inner passageway may be disposed symmetrically about the central cavity, and the air discharge outlet may be configured to direct compressed air into the combustor circumferentially about the gaseous fuel entering the combustor through the central cavity. The fuel injector may further include an annular outer passageway circumferentially disposed about the annular inner passageway. The outer passageway may be configured to direct a liquid fuel into the combustor circumferentially about the compressed air entering the combustor through the air discharge outlet.

DETAILED DESCRIPTION

Figure 1:
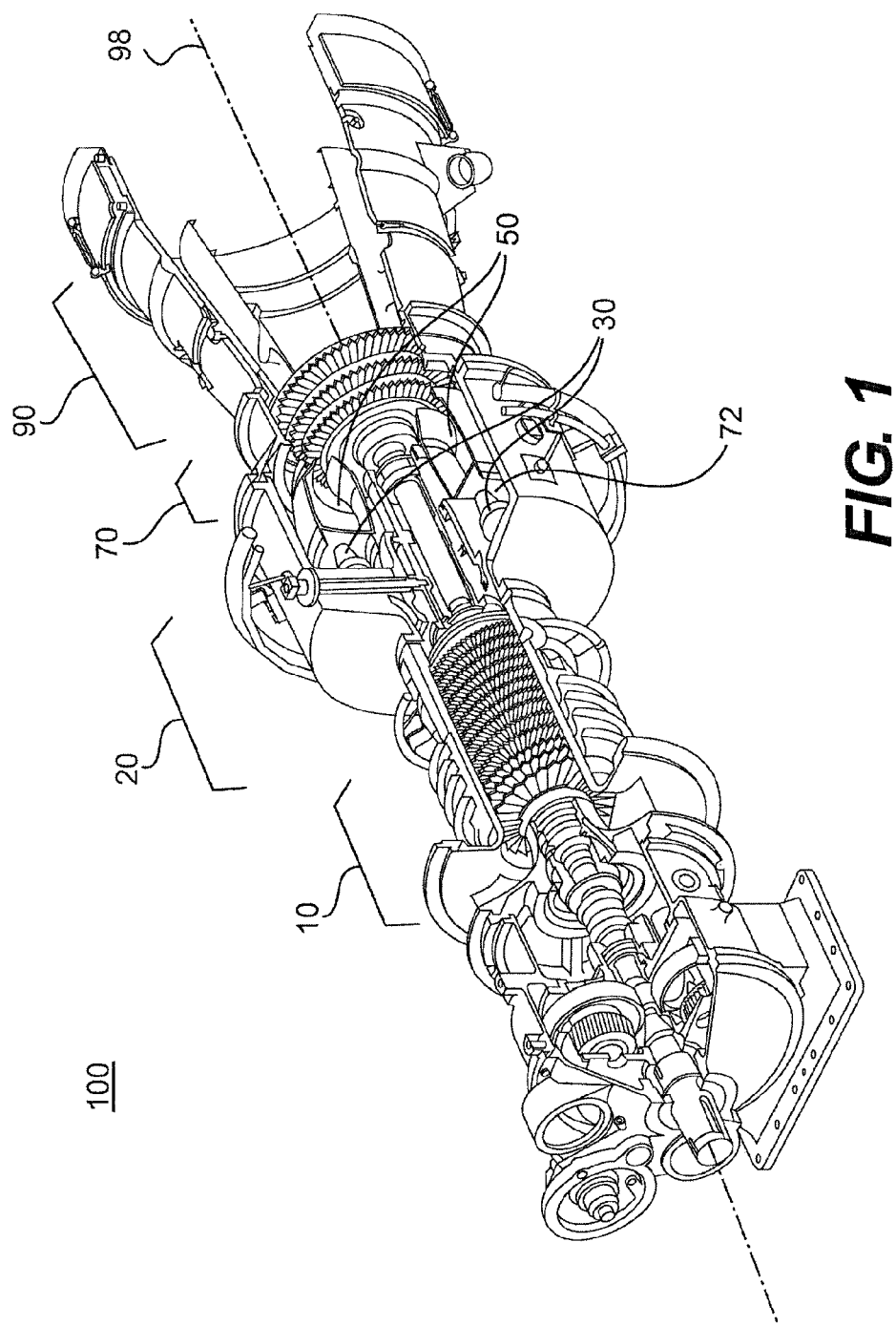
FIG. 1 is an illustration of an exemplary disclosed gas turbine engine system.

FIG. 1 illustrates an exemplary gas turbine engine (GTE) 100. GTE 100 may have, among other systems, a compressor system 10, a combustor system 20, a turbine system 70, and an exhaust system 90 arranged along an engine axis 98. Compressor system 10 compresses air and delivers the compressed air to an enclosure 72 of combustor system 20. The compressed air is then directed from enclosure 72 into a combustor 50 through one or more fuel injectors 30 positioned therein. One or more types of fuel (such as, for example, a gaseous fuel and a liquid fuel) may be directed to the fuel injector 30 through fuel lines (not identified). GTE 100 may operate using different types of fuel depending upon availability of a particular fuel. For instance, when GTE 100 operates at a site with an abundant supply of a gaseous fuel (such as natural gas), the gaseous fuel may be used to operate the GTE 100. Under some operating conditions, another type of fuel (such as diesel fuel) may be used to operate the GTE 100. The fuel burns in combustor 50 to produce combustion gases at high pressure and temperature. These combustion gases are used in the turbine system 70 to produce mechanical power. Turbine system 70 extracts energy from these combustion gases, and directs the exhaust gases to the atmosphere through exhaust system 90. The layout of GTE 100 illustrated in FIG. 1, and described above, is only exemplary and fuel injectors 30 of the current disclosure may be used with any configuration and layout of GTE 100.

Figure 2:
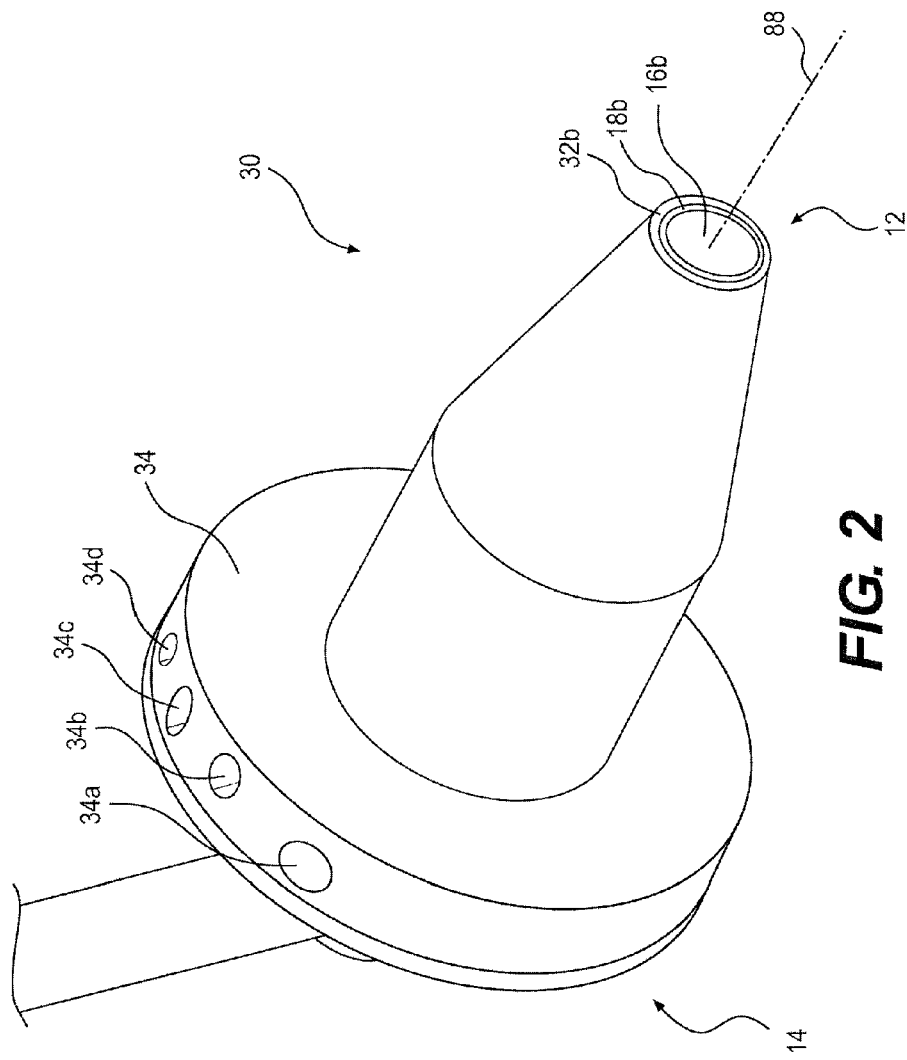
FIG. 2 is a perspective view of an exemplary fuel injector used in the turbine engine of FIG. 1.
Figure 3:
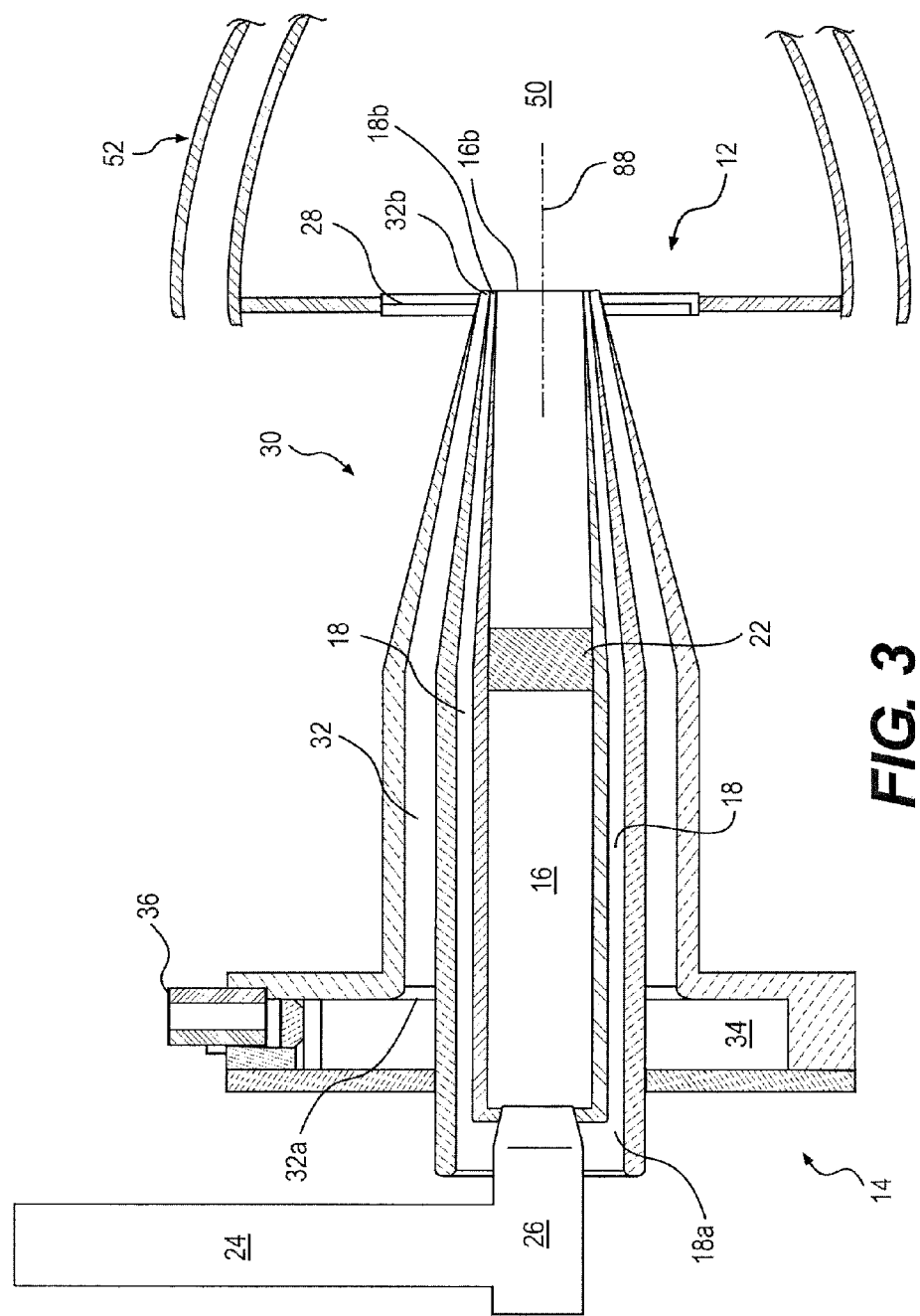
FIG. 3 is a cross-sectional illustration of the fuel injector of FIG. 2.

FIG. 2 is a perspective view of an embodiment of fuel injector 30 which may be coupled to combustor 50. FIG. 3 is a cross-sectional view of fuel injector 30 schematically illustrated as being coupled to combustor 50. In the description that follows, reference will be made to both FIGS. 2 and 3. Fuel injector 30 may be a single fuel injector or a dual fuel injector. A dual fuel injector is an injector that is configured to deliver different types of fuel (for example, gaseous and liquid fuel) to the combustor 50. Fuel injector 30 extends from a first end 12 to a second end 14 along a longitudinal axis 88. As illustrated in FIG. 2, the fuel injector 30 may have a shape resembling the frustum of a cone proximate the first end 12. The first end 12 of the fuel injector 30 may be coupled to combustor 50, and the second end 14 of the fuel injector 30 may extend into enclosure 72 (see FIG. 1). As is known in the art, combustor 50 is an annular chamber, bounded by a liner 52, located around engine axis 98 of GTE 100 (see FIG. 1).

Fuel injector 30 includes a fuel nozzle 26 at the second end 14 that is configured to direct a fuel into the combustor 50. The fuel nozzle 26 directs the fuel through a central cavity 16 that extends longitudinally along a longitudinal axis 88 of fuel injector 30. In some embodiments, the central cavity 16 may be a centrally located passageway that extends from second end 14 to an exit opening 16b at the first end 12. The exit opening 16b directs the fuel, injected into the central cavity 16 by fuel nozzle 26, into the combustor 50 substantially unmixed with air. Exit opening 16b may be centrally positioned at the first end 12 of the fuel injector 30 around the longitudinal axis 88. In some embodiments, the central cavity 16 may be cylindrically shaped and have a substantially constant diameter from the first end 12 to the second end 14. However, in some embodiments, the central cavity 16 may have a generally convergent shape such that the diameter of the central cavity 16 at the first end 12 is smaller than the diameter at the second end 14. In some embodiments, the central cavity 16 may converge substantially uniformly along an entire length of the fuel injector 30. However in some embodiments, the central cavity 16 may only converge along a portion of its length. For example, only a portion of the length of the central cavity 16 proximate first end 12 may be convergent while the remaining portion (that is, proximate the second end 14) of the central cavity 16 may be substantially cylindrical. The angle of convergence may depend upon the application. In some embodiments, the angle of convergence may be such that the diameter of the central cavity 16 at the first end 12 is 2-3% smaller than its diameter at the second end 14. A convergent central cavity 16 increases the velocity of the fuel as it flows therethrough. In some embodiments, an air swirler 22 may also be positioned in the central cavity 16 to induce a swirl to the fuel flowing therethrough.

A fuel pipe 24 may direct the fuel into the fuel nozzle 26. In general, fuel pipe 24 and the fuel nozzle 26 may direct any type of fuel into the central cavity 16. In some embodiments a gaseous fuel may be directed into the central cavity 16 through the fuel nozzle 26. In some embodiments, this gaseous fuel may be a low calorific fuel gas (such as, for example, land fill gas, mine-off gas, process gas from chemical, food, paint plants, etc.). This fuel travels downstream through the central cavity 16, enters the combustor 50 through exit opening 16b, and ignites. In some embodiments, the gaseous fuel delivered to the combustor 50 through the central cavity 16 may reach the combustor 50 substantially unmixed with air. In these embodiments, the central cavity 16 may not include an opening that discharges compressed air into the central cavity 16. That is, the central cavity 16 may include only openings (one or more openings) that discharge gaseous fuel into the central cavity 16. In embodiments where the central cavity 16 is convergent, the linear velocity of the fuel increases as it travels through the convergent portion. The increased linear velocity forces the ignited fuel away from the fuel injector 30 and assists in reducing flashback. Flashback is an undesirable condition that occurs in some fuel injectors where the flame in the combustor 50 moves upstream into the fuel injector 30 against the flow of the fuel.

Compressed air from enclosure 72 also enters fuel injector 30 through an inlet opening 18a at the second end 14. Compressed air that enters through the inlet opening 18a flows through an inner air passage 18 and enters the combustor 50 through an exit opening 18b at the first end 12. Exit opening 18b of the inner air passage 18 is an annularly shaped opening positioned radially outwards of exit opening 16b of the central cavity 16. Inner air passage 18 is an annular passageway symmetrically disposed about the longitudinal axis 88, and positioned radially outwards of the central passageway 16. The compressed air from the inner air passage 18 flows into the combustor 50 around the fuel stream from the central cavity 16 and acts as a shroud around this fuel stream. The size of the inlet opening 18a may be such that the quantity of air entering the combustor 50 through the inner air passage 18 is sufficient to act as a shroud around the fuel stream from the central cavity 16. The inlet opening 18a may be ring-shaped opening annularly positioned around longitudinal axis 88. However inlet openings of other shapes are also contemplated. For instance, in some embodiments, inlet opening 18a may resemble segments of a circle around longitudinal axis 88. Inlet opening 18a may include features (angles, chamfers, etc.) configured to modify the angle of entry of air into the fuel injector 30. In some embodiments, the inlet opening 18a may be configured such that the flow of air into the fuel injector 30 is substantially axial (that is, along the longitudinal axis 88).

The shape of the inner air passage 18 may be configured to discharge air into the combustor 50 as a shroud around the fuel stream from central cavity 16. Due to the generally conical shape of the fuel injector 30 proximate the first end 12, the inner air passage 18 may progressively converge towards the longitudinal axis 88 as it approaches the exit opening 18b. That is, the radial distance of the inner air passage 18 from the longitudinal axis 88 may decrease as the inner air passage 18 extends towards the exit opening 18b. In some embodiments, as illustrated in FIG. 3, only a portion of the length of the inner air passage 18, proximate the first end 12, may have a convergent shape. However, it is contemplated that in some embodiments, substantially an entire length of the inner air passage 18 (from the second end 14 to the first end 12) may be convergent. The gradually decreasing radial distance of the inner air passage 18 will decrease the cross-sectional area of the passage as it approaches the exit opening 18b. The decreasing cross-sectional area will increase the linear velocity of the compressed air in the inner air passage 18 as it moves towards the exit opening 18b. The decreasing radial distance will increase the spin or the angular velocity of the compressed air in the inner air passage 18 as it travels towards the exit opening 18b. Because of the principle of conservation of angular momentum, the compressed air exiting the exit opening 18b with increased angular velocity will move outwardly in a direction away from the longitudinal axis 88. The convergent shape of the inner air passage 18 thus reduces the tendency of the compressed air from the inner air passage 18 to mix with, and dilute, the fuel stream from the central cavity 16 immediately upon exit into the combustor 50. It should be noted that a convergent shape of the inner air passage 18 is not a requirement, and in some embodiments, the inner air passage 18 may not be convergent.

Fuel injector 30 also includes an annularly shaped outer passage 32 disposed radially outwards of the inner air passage 18. The outer passage 32 may extend from an inlet opening 32a proximate the second end 14 to an annularly shaped exit opening 32b positioned radially outwards exit opening 18b of inner air passage 18. The inlet opening 32a may open into an annular chamber 34 disposed at the second end 14 of the fuel injector 30. Annular chamber 34 may be an annular cavity that extends around the fuel injector 30 at the second end 14. The annular chamber 34 may include multiple inlet ports (with fluid conduits 36 coupled thereto) to direct one or more fluids into the annular chamber 34. In some embodiments, these multiple inlet ports may include a first inlet port 34a, a second inlet port 34b, a third inlet port 34c, and a fourth inlet port 34d. The first inlet port 34a may be configured to deliver a gaseous fuel, a second inlet port 34b may be configured to direct a liquid fuel, a third inlet port 34c may be configured to direct shop air, and a fourth inlet port 34d may be configured to direct steam (or water) into the annular chamber 34. During operation of GTE 100, one or more fluids may be selectively directed into the annular chamber 34 through these multiple inlet ports at the same time. For example, in some applications a liquid fuel and shop air may be directed into the annular chamber 34, at the same time, during starting of the GTE 100. After GTE 100 reaches a desired speed, the liquid fuel and shop air supply may be stopped, and gaseous fuel may be directed into the annular chamber 34. The fluid (liquid fuel, gaseous fuel, shop air, steam, etc.) in the annular chamber 34 may travel through the outer passage 32 and enter the combustor 50 through exit opening 32b.

Compressed air from enclosure 72 also enters the combustor 50 through an air swirler 28 positioned circumferentially outwardly of the fuel injector 30 at the first end 12. Air swirler 28 may include one or more blades or vanes shaped to induce a swirl to the compressed air passing therethough. Although the air swirler 28 illustrated in FIG. 3 is an axial air swirler, any type of air swirler known in the art (for example, radial air swirler) may be used. As the compressed air from the enclosure 72 flows into the combustor 50 through the air swirler 28, a swirl will be induced to the air. This swirled air will spin outwardly and move towards the outer walls of combustor 50. Since air swirlers and their role in the functioning of GTE 100 are known in the art, for the sake of brevity, air swirler 28 is not discussed in detail herein.

In some embodiments, a portion of the length (or even the entire length) of the outer passage 32 may converge towards the longitudinal axis 88 as it approaches the exit opening 32b. That is, the radial distance (and hence the cross-sectional area) of the outer passage 32 from the longitudinal axis 88 may decrease towards the combustor 50. As explained earlier with reference to the inner air passage 18, this decreasing radial distance increases the linear and angular velocity of the fluid as it travels through the outer passage 32. Due to the increased angular velocity, the fluid exiting the exit opening 32b will spin outwardly and move in a direction away from the longitudinal axis 88 (because of conservation of angular momentum). This outwardly moving fluid will meet and mix with the swirled air stream from the air swirler 28 and rapidly mix. When the fluid directed through the outer passage 32 is a fuel (liquid or gaseous), the mixing of the fuel and air reduces the flame temperature, and thereby the $NO_x$ production, in the combustor 50. The angle of convergence of the outer passage 32 (that is, the angle between the outer passage 32 and the longitudinal axis 88) may be any value and may depend upon the application. In some exemplary embodiments, an angle of convergence of between about 20° and 80° may be suitable. It should be noted that, although FIG. 3 illustrates the thickness of the convergent outer passage 32 and the convergent inner air passage 18 as decreasing towards the first end 12, this is not a requirement. That is, in some embodiments, a convergent passage (outer passage 32 and/or inner air passage 18) may be a passageway with a constant thickness along its length that angles towards the longitudinal axis 88.

In some embodiments, some or all of the multiple ports (first, second, third, and fourth port 34a, 34b, 34c, 34d) may be positioned in annular chamber 34 such that the fluids enter the annular chamber 34 tangentially to induce a spin to the fluid. The induced spin may assist in thorough mixing of the fluid with gases in the combustor 50. A fluid may be tangentially directed into the annular chamber 34 by tangentially positioning a port or by adapting the shape of the port (for example, a curved port, angled port, etc.) for tangential entry. Although a cylindrically shaped annular chamber 34 is illustrated in FIGS. 2 and 3, in some embodiments, annular chamber 34 may be a toroidal (snail shell shaped) cavity in which the area of the cavity decreases with distance around the longitudinal axis 88. In such an embodiment, as a fluid enters the toroidal annular chamber 34 and travels around the gradually narrowing cavity, a spin is introduced to the fluid.

Although the annular chamber 34 is illustrated as having four inlet ports, this is only exemplary. Other embodiments of fuel injectors 30 may have a different number of inlet ports. For example, in some embodiments of fuel injector 30, only one inlet port may be provided to direct a gaseous fuel or a liquid fuel into the annular chamber 34, and in another embodiment two inlet ports may be provided to direct a liquid fuel and shop air into the annular chamber 34. Any type of gaseous fuel (natural gas, coal gas, coke oven gas, land fill gas, mine-off gas, process gas, etc.) and liquid fuel (for example, kerosene, diesel fuel, etc.) may be directed into the annular chamber 34 through the first and second ports 34a, 34b, respectively. In some embodiments, the same gaseous fuel may be delivered through the first port 34a and the fuel nozzle 26, while in other embodiments, different gaseous fuels may be provided through the first port 34a and the fuel nozzle 26. Third port 34c may direct shop air to the annular chamber 34. Shop air may be air that is compressed using a compressor separate from the compressor system 10 of GTE 100. In some embodiments, shop air may be supplied only during initial lightoff of GTE 100. During lightoff, the shop air may have a higher pressure than the compressed air from compressor system 10. The shop air may assist in atomization of the liquid fuel when liquid fuel is directed into the annular chamber 34. The steam directed into the annular chamber 34 through the fourth port 34d may assist in reducing the flame temperature (and thereby reduce $NO_x$ production) in the combustor 50.

A common concern with fuel injectors is the cross-contamination of fuel delivery lines during operation. During operation, combustion driven turbulent pressure fluctuations may induce small pressure variations in the vicinity of different fuel injectors 30 in the combustor 50. These pressure differences may induce fuel to migrate into fuel lines in lower pressure regions and create carbonaceous deposits therein. For example, when GTE 100 operates with liquid fuel delivered through outer passage 32, the central cavity 16 may be inactive. That is, during this time gas fuel may not be directed into the combustor 50 through central cavity 16. Absent the compressed air supply through exit opening 18b that forms a shroud (or an air shell, air curtain, etc.) around exit opening 16b, pressure fluctuations in the combustor 50 may cause the liquid fuel to enter the central cavity 16 (and the liquid fuel nozzle 26) and ignite or decompose therein to cause coking. However, the compressed air supply through outlet opening 18b circumferentially disposed around outlet opening 16b prevents the liquid fuel from migrating into the central cavity 16. The increased angular momentum of the liquid fuel emanating from the outer passage 32 will also cause the liquid fuel to move in a direction away from the longitudinal axis 88 and assist in keeping the liquid fuel away from the central cavity 16. In a similar manner, the compressed air supply through the outlet opening 18b shrouds and prevents the gaseous fuel stream from the central cavity 16 from entering and depositing in the outer passage 32.

INDUSTRIAL APPLICABILITY

The disclosed fuel injector may be applicable to any turbine engine. In one embodiment of the fuel injector, two separate streams of fuel are directed into the combustor through the fuel injector, and the respective fuel outlets are positioned to reduce cross-contamination. A compressed air stream, is configured to separate the two fuel outlets from each other. In some embodiments, the fuel through the fuel outlets is directed to the combustor in a manner to reduce flashback. The operation of a gas turbine engine with an embodiment of a disclosed fuel injector will now be described.

Figure 4:
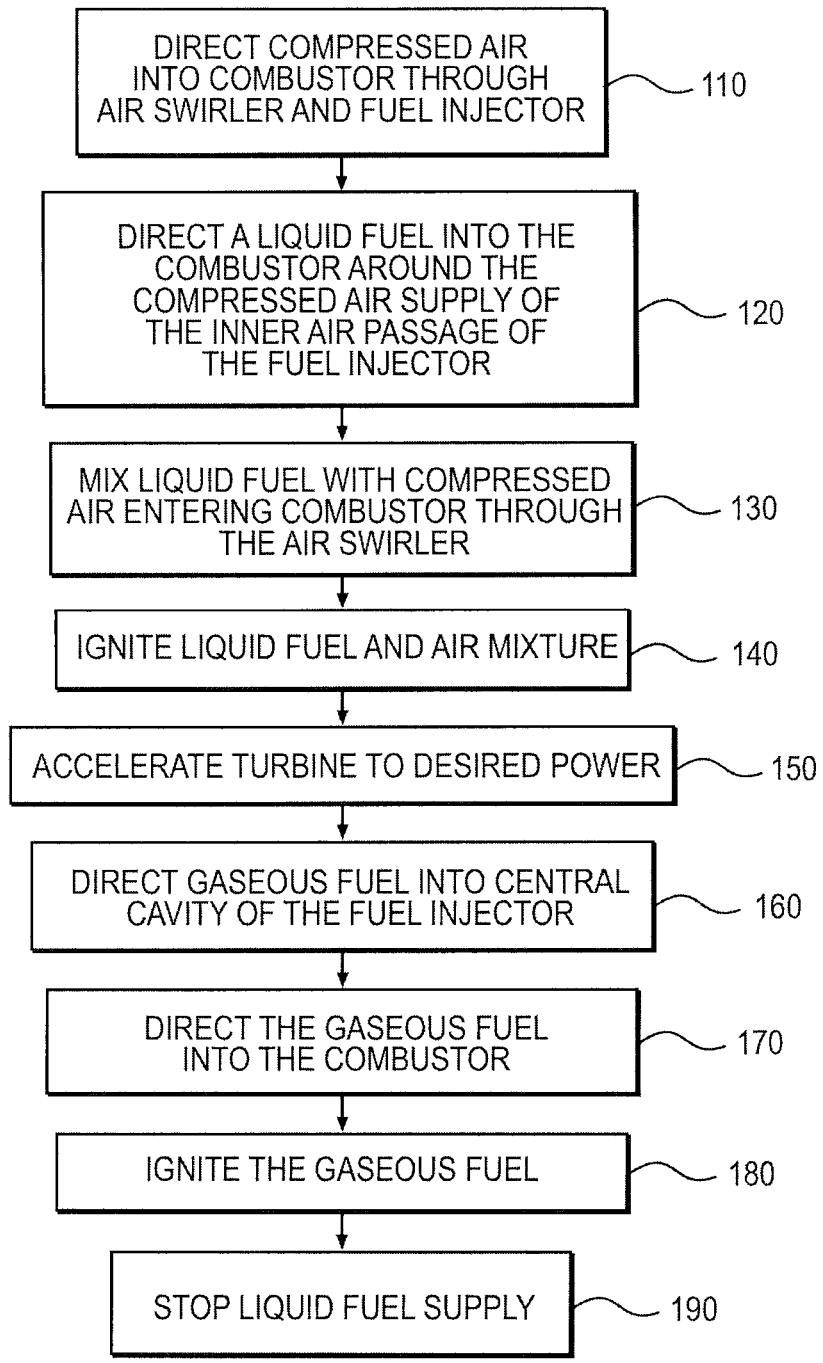
FIG. 4 is a flow chart that illustrates an exemplary operation of the fuel injector of FIG. 2.

FIG. 4 is a flowchart that illustrates an exemplary application of fuel injector 30. GTE 100 may be started with a liquid fuel and then transitioned to a gaseous fuel at a nominal power. During startup, compressed air from enclosure 72 is directed into the combustor 50 through the air swirler 28 and through one or more fuel injectors 30 coupled to the combustor 50 (step 110). The compressed air supplied though each fuel injector 30 flows through the inner air passage 18 of the fuel injector 30 and exits into the combustor 50 through exit opening 18b. This compressed air entering the combustor 50 through the inner air passage 18 surrounds the exit opening 16b of the central cavity 16, and acts as a shroud around the exit opening 16b the central cavity 16.

Liquid fuel (directed into the fuel injector 30 through the second inlet port 34b) is also directed into the combustor 50 around the compressed air supply from the inner air passage 18 (step 120). In some embodiments, due to the shape of the outer passage 32 that directs the liquid fuel to the combustor 50, the angular velocity and the linear velocity of the liquid fuel may increase as the fuel travels towards the combustor 50. The increased angular velocity may cause the liquid fuel that exits into the combustor 50 through the outer passage 32 to be flung outwards towards the combustor walls and away from the central cavity 16. The outwardly traveling liquid fuel may reduce the possibility of the liquid fuel migrating into the central cavity 16 and decomposing therein. The compressed air supply from the inner air passage 18 may also act as an air curtain that prevents the liquid fuel from migrating into the central cavity 16.

Within the combustor 50, the outwardly moving liquid fuel stream will mix with the portion of injection air flowing into the combustor 50 through the air swirler 28 (step 130). The mixed liquid fuel and air will ignite and travel outwards towards the combustion walls and spread around the combustor 50 (step 140). The GTE 100 is then accelerated to a desired power value (idle speed, a nominal load, etc.) using the liquid fuel (step 150). After the desired power value is reached, gaseous fuel supply to the combustor 50 through the central cavity 16 may be initiated by directing the gaseous fuel into the central cavity 16 through fuel nozzle 26 (step 160). This gaseous fuel from the central cavity 16 enters the combustor 50 substantially unmixed with compressed air. Within the combustor, the unmixed gaseous fuel stream may be shrouded by the compressed air supply from the circumferentially disposed exit opening 18b (step 170). Within the combustor 50, the gaseous fuel stream ignites and moves away from the fuel injector 30 (step 180).

The liquid fuel supply through the outer passage 32 may now be stopped (step 190). The compressed air stream surrounding the gaseous fuel stream from the central cavity 16 prevents the gaseous fuel from migrating upwards into the outer passage 32 and decomposing therein. In some embodiments, the shape of the central cavity 16 may be configured to increase the linear velocity of the gaseous fuel entering the combustor 50. The increased linear velocity of the gaseous fuel assists in moving the ignited fuel away from the fuel injector 30 and reducing the possibility of flashback. In some embodiments, after terminating the liquid fuel supply through outer passage 32, gaseous fuel may be supplied to the combustor 50 through the outer passage 32. In some embodiments, when the flame temperature within the combustor 50 causes the $NO_x$ emissions to increase above a desired value, steam may be directed into the combustor 50 through the outer passage 32 to reduce the flame temperature. In some embodiments, along with the liquid fuel, shop air may also be directed into the combustor 50 through the outer air passage 32 to increase the volume of air in the combustor. The ability to direct multiple fuels and other fluids into the combustor 50 through the fuel injector 30 increases the versatility of the fuel injector 40 while reducing $NO_x$ emissions.

It will be apparent to those skilled in the art that various modifications and variations can be made to the disclosed fuel injector. Other embodiments will be apparent to those skilled in the art from consideration of the specification and practice of the disclosed fuel injector. It is intended that the specification and examples be considered as exemplary only, with a true scope being indicated by the following claims and their equivalents.

What is claimed is:

1. A fuel injector for a gas turbine engine comprising:
   an injector housing including a central cavity extending along a longitudinal axis from an upstream end to a downstream end, the downstream end of the central cavity configured to be fluidly coupled to a combustor of the turbine engine, the central cavity also configured to direct a first fuel into the combustor substantially unmixed with air;
   an annular air discharge outlet circumferentially disposed about the downstream end of the central cavity, the air discharge outlet being configured to discharge compressed air into the combustor circumferentially about the first fuel from the central cavity;
   an annular fuel discharge outlet circumferentially disposed about the air discharge outlet at the downstream end, the fuel discharge outlet being configured to discharge a second fuel into the combustor circumferentially about the compressed air from the air discharge outlet;
   an outer annular passageway extending from the upstream end of the injector housing to the fuel discharge outlet at the downstream end, wherein the outer annular passageway has a first outer diameter at the upstream end;
   an annular chamber extending around the upstream end of the injector housing and fluidly coupled to the outer annular passageway at the upstream end, wherein the annular chamber has a second outer diameter greater than the first outer diameter of the outer annular passageway; and
   a plurality of inlet ports radially coupled to an outer wall of the annular chamber, wherein a first inlet port of the plurality of inlet ports is configured to direct the second fuel radially inward into the annular chamber.

2. The fuel injector of claim 1, further including a fuel nozzle at the upstream end of the central cavity, the fuel nozzle being configured to discharge the first fuel into the central cavity.

3. The fuel injector of claim 1, further including an inner annular passageway extending from an annular inlet at the upstream end of the injector housing to the air discharge outlet at the downstream end, the inner annular passageway being disposed symmetrically about the central cavity.

4. The fuel injector of claim 3, wherein at least a portion of the inner annular passageway converges towards the longitudinal axis.

5. The fuel injector of claim 3, wherein the outer annular passageway is disposed symmetrically about the central cavity and radially outwards from the inner annular passageway.

6. The fuel injector of claim 5, wherein at least a portion of the outer annular passageway converges towards the longitudinal axis.

7. The fuel injector of claim 1, wherein the second fuel is a liquid fuel and the plurality of inlet ports includes a second inlet port configured to direct a gaseous fuel into the outer annular passageway.

8. The fuel injector of claim 7, wherein the plurality of inlet ports includes a third inlet port configured to direct steam into the outer annular passageway.

9. The fuel injector of claim 1, wherein the central cavity is a convergent passageway.

10. The fuel injector of claim 1, wherein the central cavity includes only a single inlet, the single inlet being configured to discharge the first fuel into the central cavity.

11. A method of operating a gas turbine engine comprising:
directing a gaseous fuel into a combustor of the gas turbine engine through a central cavity of a fuel injector substantially unmixed with compressed air, the central cavity extending longitudinally from an upstream end to a downstream end longitudinally fluidly coupled to the combustor;
directing compressed air into the combustor as a shroud around the gaseous fuel;
directing a second fuel into the combustor circumferentially about the compressed air, wherein directing the second fuel includes increasing an angular velocity of the second fuel in the fuel injector;
providing an outer annular passageway extending from an upstream end to a fuel discharge outlet, wherein the outer annular passageway has a first outer diameter at the upstream end;
providing an annular chamber fluidly coupled to the outer annular passageway at the upstream end of the outer annular passageway, wherein the annular chamber has a second outer diameter greater than the first outer diameter of the outer annular passageway; and
providing a plurality of inlet ports radially coupled to an outer wall of the annular chamber, wherein a first inlet port of the plurality of inlet ports directs the second fuel radially inward into the annular chamber.

12. The method of claim 11, further including increasing a linear velocity of the second fuel in the fuel injector prior to directing the second fuel into the combustor, wherein the second fuel is a liquid fuel.

13. The method of claim 11, wherein directing the gaseous fuel, directing the compressed air, and directing the second fuel occurs at a same time.

14. The method of claim 11, further including directing steam into the combustor circumferentially around the compressed air.

15. A gas turbine engine, comprising:
a compressor system;
a turbine system;
a combustor system including a combustor; and
a fuel injector extending from an upstream end to a downstream end, the fuel injector being coupled to the combustor at the downstream end, the fuel injector including:
a central cavity extending from the upstream end to the downstream end along a longitudinal axis, the central cavity being configured to direct a gaseous fuel into the combustor substantially unmixed with compressed air;
an annular air discharge outlet circumferentially disposed about the central cavity, the annular air discharge outlet being configured to direct compressed air into the combustor circumferentially around the gaseous fuel entering the combustor from the central cavity;
an outer passageway circumferentially disposed about the central cavity, the outer passageway being configured to selectively direct a gaseous fuel and a liquid fuel into the combustor circumferentially around the compressed air from the air discharge outlet, wherein the outer passageway has a first outer diameter at the upstream end; and
an annular chamber, fluidly coupled to the outer passageway, that extends around the fuel injector at the upstream end of the fuel injector, wherein the annular chamber has a second outer diameter greater than the first outer diameter of the outer passageway;
a plurality of inlet ports radially coupled to an outer wall of the annular chamber, wherein a first inlet port of the plurality of inlet ports is configured to direct the gaseous or liquid fuel radially inward into the annular chamber.

16. The gas turbine of claim 15, wherein the first inlet port is configured to direct the gaseous fuel radially inward into the annular chamber, a second inlet port of the plurality of inlet ports is configured to direct the liquid fuel radially inward into the annular chamber, and a third inlet port of the plurality of inlet ports is configured to direct steam radially inward into the annular chamber.

17. The gas turbine of claim 15, further including an air swirler circumferentially disposed about the fuel injector.

18. The gas turbine engine of claim 17, wherein the inner passageway and the outer passageway include portions that converge towards the longitudinal axis.

* * * * *